July 7, 1931.     C. E. AVERY     1,813,108
ELECTRIC PULL SOCKET
Filed Nov. 25, 1929
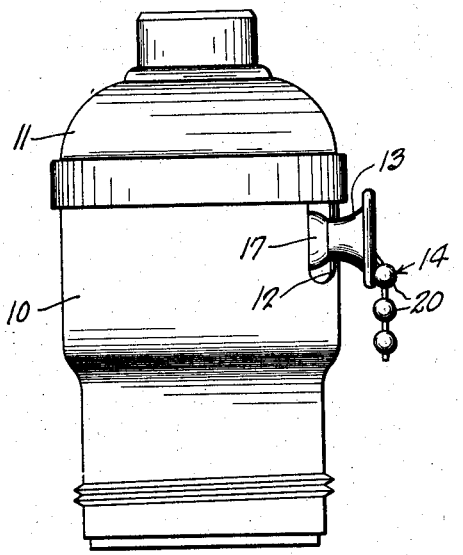
Fig.1.
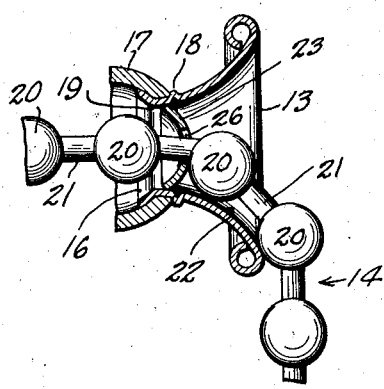
Fig.2.
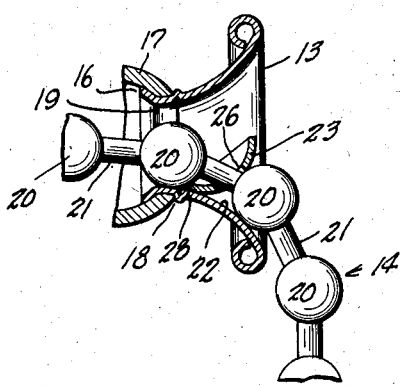
Fig.3.
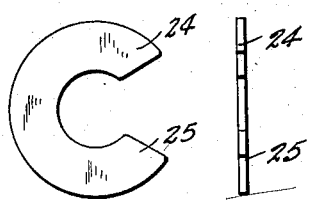 
Fig.4.   Fig.5.
 
Fig.6.   Fig.7.
Inventor
Charles E. Avery
By Wooster & Davis
Attorneys Patented July 7, 1931

1,813,108

UNITED STATES PATENT OFFICE

CHARLES E. AVERY, OF BRIDGEPORT, CONNECTICUT, ASSIGNOR TO HARVEY HUBBELL, INCORPORATED, OF BRIDGEPORT, CONNECTICUT, A CORPORATION OF CONNECTICUT

ELECTRIC PULL SOCKET

Application filed November 25, 1929. Serial No. 409,537.

This invention relates to a stop for an electric pull socket chain and has for an object to provide a stop which will allow the chain to be pulled with less effort.

At present, as is well known, an electric pull socket chain which consists of a series of balls and connecting links is usually provided with a stop which consists of a ball of larger diameter than the diameter of the remaining balls of the chain, and this stop ball takes the place of one of the chain balls at the appropriate position. This stop ball is larger than the minimum diameter of the bell shaped chain guide, and thus stops the rest of the chain from entering the socket after the chain has been pulled and released. Due to the larger diameter of the stop ball, the chain ball or balls next thereto on either side thereof can not come in contact with the inside of the bell of the chain guide, thus increasing the friction of this stop ball against the bell and making the pulling of the chain somewhat of an effort, and the chain does not slide easily and smoothly on the surface of the guide because practically all the pressure and, therefore, the friction between the chain and the guide is at the single point of contact of this large ball on the surface of the guide.

This invention has for an object to provide a stop which will have all the advantages of the present ball stop and which will allow the balls of the chain next thereto to ride on the inside of the bell and thus distribute the pressure and friction between the chain and guide to lessen the effort necessary in operating the pull chain and give a smoother and easier operation.

It is also an object of the invention to provide a stop which can be applied to any desired position on the chain.

With the foregoing and other objects in view, this invention comprises certain constructions, combinations and arrangements of parts as set forth, disclosed and claimed in the annexed specification considered in connection with the accompanying drawings.

In the drawings:

Fig. 1 shows an electric lamp pull socket having the usual bell shaped chain guide and chain.

Fig. 2 shows a section through the bell guide showing the chain therethrough to which one embodiment of the stop constituting the invention has been applied, the stop being in section and the chain in relaxed position.

Fig. 3 is a view similar to Fig. 2, but with the chain slightly pulled from relaxed position to show the operation of the stop.

Figs. 4 and 5 are plan and side views of one form of blank from which one embodiment of this invention is formed, and Figs. 6 and 7 are plan and side views of an embodiment of the stop of this invention formed from the blank shown in Figs. 4 and 5.

This invention has been shown as applied to an electric pull socket and is adapted for use with any type of socket or switch using a pull chain. The enclosing shell shown comprises the usual shell or body section 10 and the cap section 11 enclosing the works of the socket including any suitable type of pull socket switch, not shown in detail in the present construction as they of themselves form no part of this invention. The shell section 10 has the usual notch 12 leading from its upper or inner end for the bell shaped guide 13 for the pull chain 14 for operating the switch, not shown.

The bell guide 13 may be attached to the socket works, not shown, in the usual manner by any suitable means as by having its inner end 16 turned or riveted in the open end of a semi-spherical member 17 attached to the socket works and by having a flange 18 riveted over the outside of member 17 as shown, the chain 14 passing through guide 13 and member 17 to the switch not shown. As usual, the diameter of the opening 19 in bell guide 13 is enough larger than the diameter of balls 20 of flexible ball chain 14 so that the chain 14 may pass freely therethrough, the chain 14 comprising balls 20 and connecting links 21.

When the chain 14 is pulled and released, there is a tendency for the balls 20 and links 21 thereof to pass through the opening 19 in guide 13 into the socket works due to the action of the retracting spring and to prevent this, it is customary to affix a stop member on the chain 14 so as not to allow any extra links to enter the socket. A common form of stop member is a ball of a diameter larger than that of opening 19 which is usually substituted for one of the balls 20. When pulling the chain, the balls thereof ride on the inner surface 22 of the guide 13. When the conventional large ball stop is used, however, the friction resisting movement of the chain is liable to be excessive due to the fact that the large ball stop raises that part of the chain so that the chain does not smoothly follow the curvature of surface 22 so long as the large stop ball is in contact therewith, and as a result there is a kinking in the chain at this point. Furthermore, this large stop ball usually prevents the next adjacent balls 20 from riding on surface 22, thus further increasing the friction and resistance to movement of the chain as all the pressure of the pull is carried by the single contact of the ball with the surface of the guide.

It is to avoid these disadvantages, and to provide a stop for the chain that will allow it to ride smoothly and easily on surface 22 of guide 13, thus allowing the chain to be pulled with much less effort and eliminating the necessity for jerking the chain, that this invention is intended. Instead of the usual large ball stop, the stop 23 herein provided comprises a washer having a diameter sufficiently larger than the diameter of opening 19 that it will not pass through, which is placed about a link 21 at the proper distance from the switch operating end of chain 14.

This stop 23 may be formed from the blank 24 shown in Figs. 4 and 5. This flat blank 24 is bent and dished inwardly until the ends 25 come into substantial contact as shown in Figs. 6 and 7, which also serves to reduce the outside diameter of the washer at the same time to a diameter as shown sufficiently larger than the diameter of opening 19. The diameter of the opening 26 in the washer is sufficiently greater than the diameter of links 21 to permit the stop to rock or turn sidewise on the link as shown in Fig. 3, and is less than the diameter of balls 20. The slit 27 left by the meeting of ends 25 may be allowed to remain as shown in Figs. 6 and 7 or may be closed, if desired. When closed, the stop 23 is placed on the proper link 21 at the time chain 14 is being assembled, or if left open, it may be sprung apart and then placed over the proper link 21.

In operation, the stop 23 will take the position shown in Fig. 2 when the chain 14 is in released position, the edge of the inner opening 26 holding against the adjacent ball 20 while the outer edge of the stop, whose diameter is larger than that of opening 19, will contact with the inside of guide 13 and thus prevent the chain 14 from entering into the socket works. As will be observed, the diameter of opening 26 is substantially larger than that of link 21. When the chain is pulled, this will permit the stop 23 to pivot about the point 28 as in Fig. 3, thus allowing the adjacent balls 20 to ride on surface 22 and allowing the curvature of the chain to be the same as the curvature of surface 22. The stop will swing to the position shown in Fig. 3, and being loose on the link because of the relatively large opening 26 merely rests loosely on the surface of the guide and then will have no further substantial frictional effect on surface 22 such as the large ball stop has, thus permitting the chain 14 to be pulled with much less effort and without a jerk and thus giving much easier and smoother operation.

Although the stop 23 is shown as dished, as is the preferred form, it will be obvious that the invention is not limited to a dished shape as shown, but also could be made in any suitable shape as for example, conical or even a flat shape and the invention is limited only by the scope of the appended claims.

Having thus set forth and disclosed the nature of this invention, what is claimed is:

1. In an electric pull socket, a chain comprising a series of balls and connecting links, a stop for said chain comprising a washer loosely fitting over a connecting link so that said washer can rock sideways.

2. In an electric pull socket, a chain comprising a series of balls and connecting links, a stop for said chain comprising a dished washer loosely fitting over a connecting link so that said washer can rock and swing.

3. In an electric pull socket, a chain comprising a series of balls and connecting links, a stop for said chain comprising a washer having an opening of a diameter greater than the diameter of the connecting links and less than the diameter of the balls.

4. In an electric pull socket, a chain comprising a series of balls and connecting links, a stop for said chain comprising a washer of a diameter greater than the diameter of the balls and having an opening of a diameter greater than the diameter of the connecting links and less than the diameter of the balls.

5. In an electric pull socket, a chain comprising a series of balls and connecting links, a stop for said chain comprising a dished washer of a diameter greater than the diameter of the balls and having an opening of a diameter greater than the diameter of the connecting links and less than the diameter of the balls.

6. In an electric pull socket, a bell guide for a pull chain, a pull chain in said guide comprising a series of balls and connecting links, a stop for said chain comprising a washer having a diameter larger than the minimum diameter of the bell opening in the guide, said washer having an opening whose diameter is larger than the diameter of the chain links to permit it to rock sideways on the link and smaller than the diameter of the chain balls.

7. In an electric pull socket, a bell guide for a pull chain, a pull chain in said guide comprising a series of balls and connecting links, a stop for said chain comprising a dished slit washer having a diameter larger than the minimum diameter of the bell opening in the guide, said washer having an opening whose diameter is larger than the diameter of the chain links to permit it to rock sideways on the link and smaller then the diameter of the chain balls.

8. In an electric pull socket, a bell guide, a ball pull chain passing through said guide comprising spaced balls connected by links, a stop mounted on one of the links, said stop being adapted to rock sideways upon passing over the wall of the guide and permit the balls of the chain to rest on the surface of the guide, and said stop being larger than the smallest part of said guide to limit inward movement of the chain.

In testimony whereof I affix my signature.

CHARLES E. AVERY.